United States Patent [19]

Traut

[11] 4,070,824
[45] Jan. 31, 1978

[54] INTEGRATED FLOW TURBINE ENGINE
[76] Inventor: Earl W. Traut, 5059 NE. 15th Ave., Fort Lauderdale, Fla. 33308
[21] Appl. No.: 557,898
[22] Filed: Mar. 12, 1975

Related U.S. Application Data

[60] Division of Ser. No. 40,633, May 26, 1970, Pat. No. 3,709,629, and a continuation of Ser. No. 299,135, Oct. 19, 1972, abandoned, and a continuation-in-part of Ser. No. 741,623, July 1, 1968, abandoned.

[51] Int. Cl.$^2$ .............................................. F02C 3/04
[52] U.S. Cl. ..................................... 60/39.43; 415/56
[58] Field of Search ................. 60/39.36, 39.43, 39.75, 60/226; 415/56, 143

[56] References Cited

U.S. PATENT DOCUMENTS

| 2,537,344 | 1/1951 | Gruss | 60/39.43 |
| 2,658,338 | 11/1953 | Ledoc | 416/95 |
| 3,310,940 | 3/1967 | Oetliker | 60/39.43 |

FOREIGN PATENT DOCUMENTS

| 941,397 | 4/1956 | Germany | 60/39.43 |

Primary Examiner—Carlton R. Croyle
Assistant Examiner—L. J. Casaregola
Attorney, Agent, or Firm—Julian C. Renfro

[57] ABSTRACT

A gas turbine having a rotor serving as both compressor and turbine, and utilizing a plurality of non-rotating arcuate members disposed in spaced relation about the periphery of the rotor. These arcuate members are involved in the directing of the flow of combustion products into proximity of the blading of the turbine, to cause its rotation, and by virtue of their advantageous design, these arcuate members not only help establish a cool air boundary against which the combustion products react and thus minimize heating of the blades, but also form passages for the subsequent exhausting of the combustion products.

11 Claims, 12 Drawing Figures

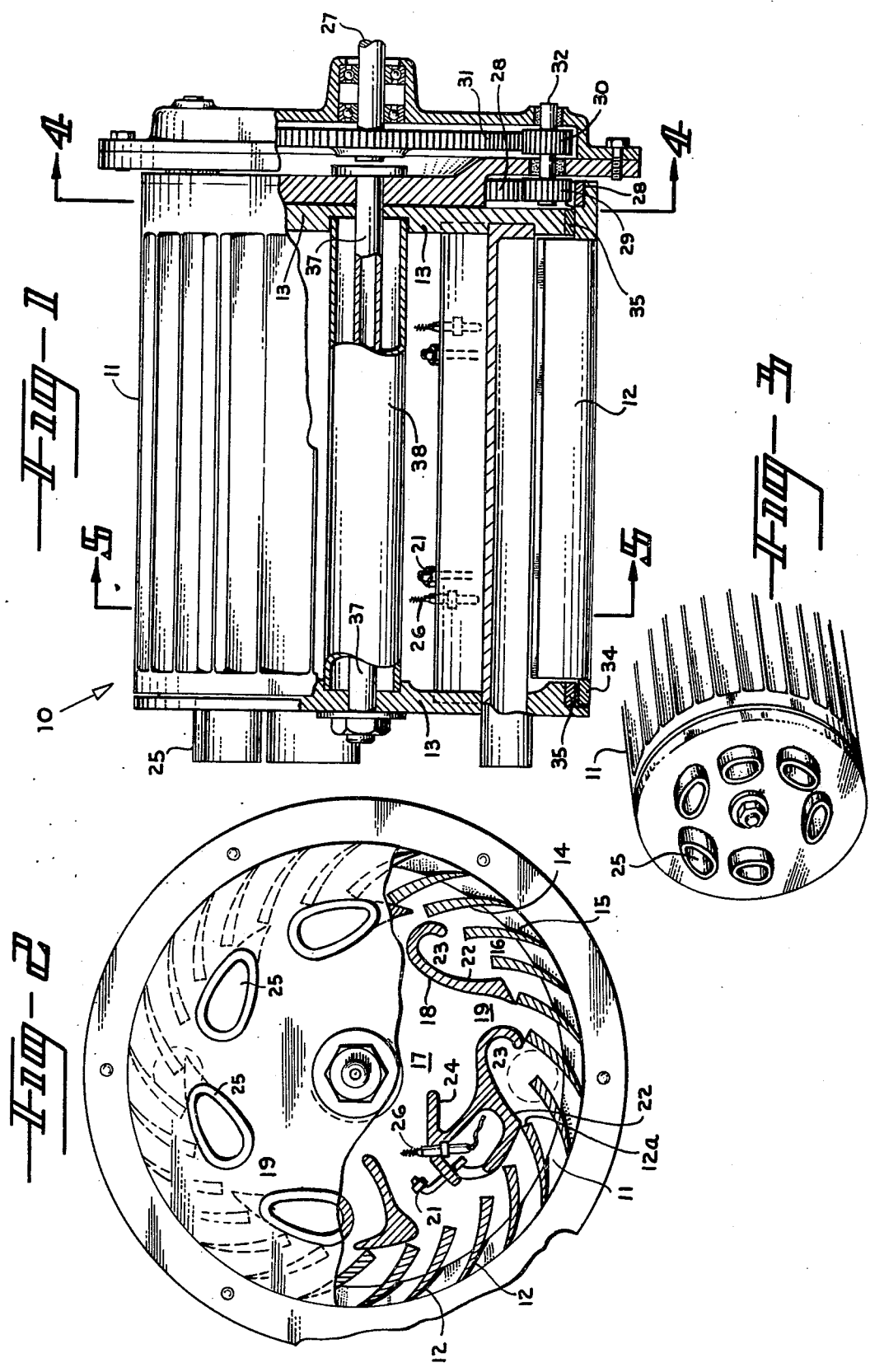

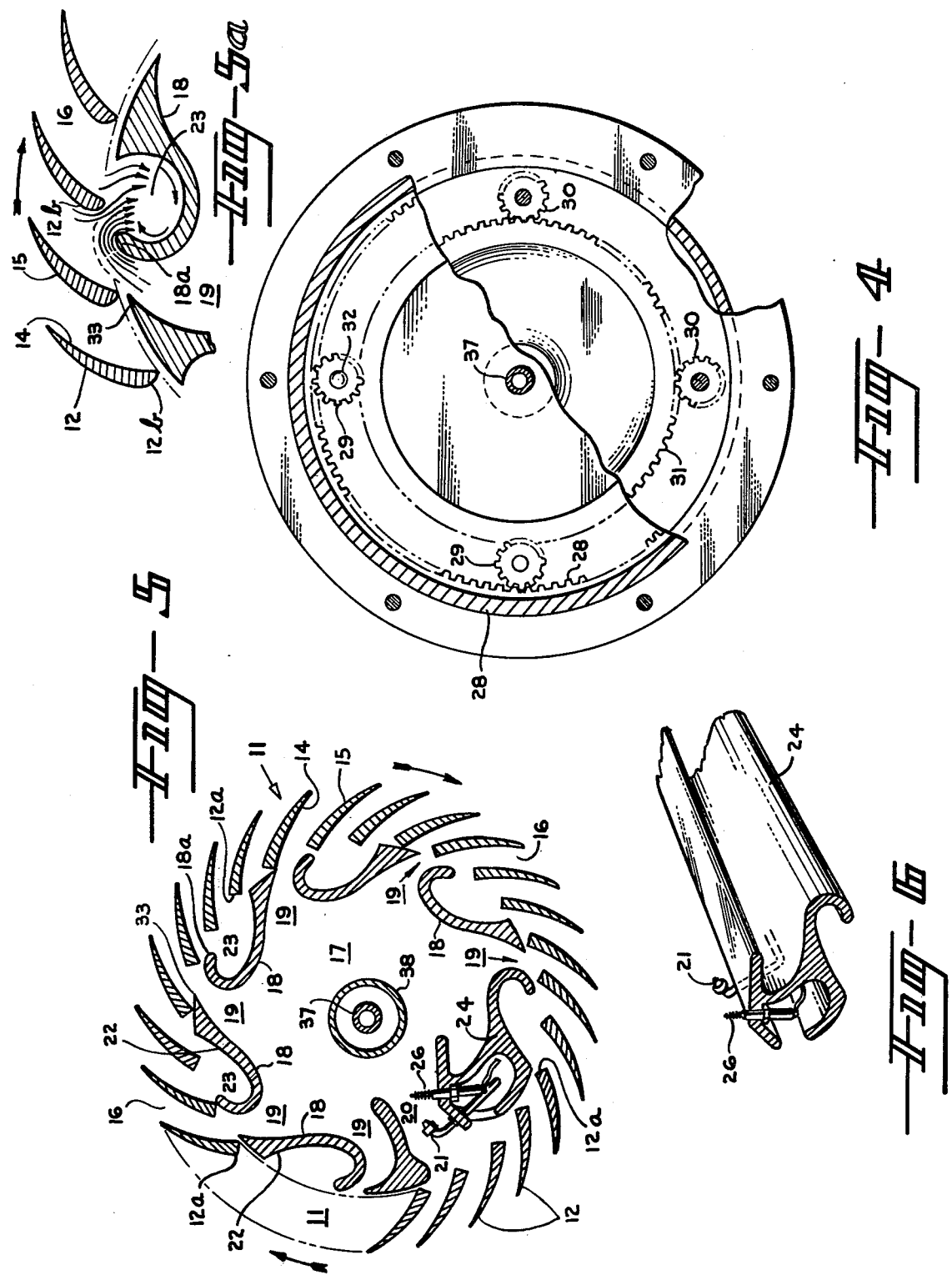

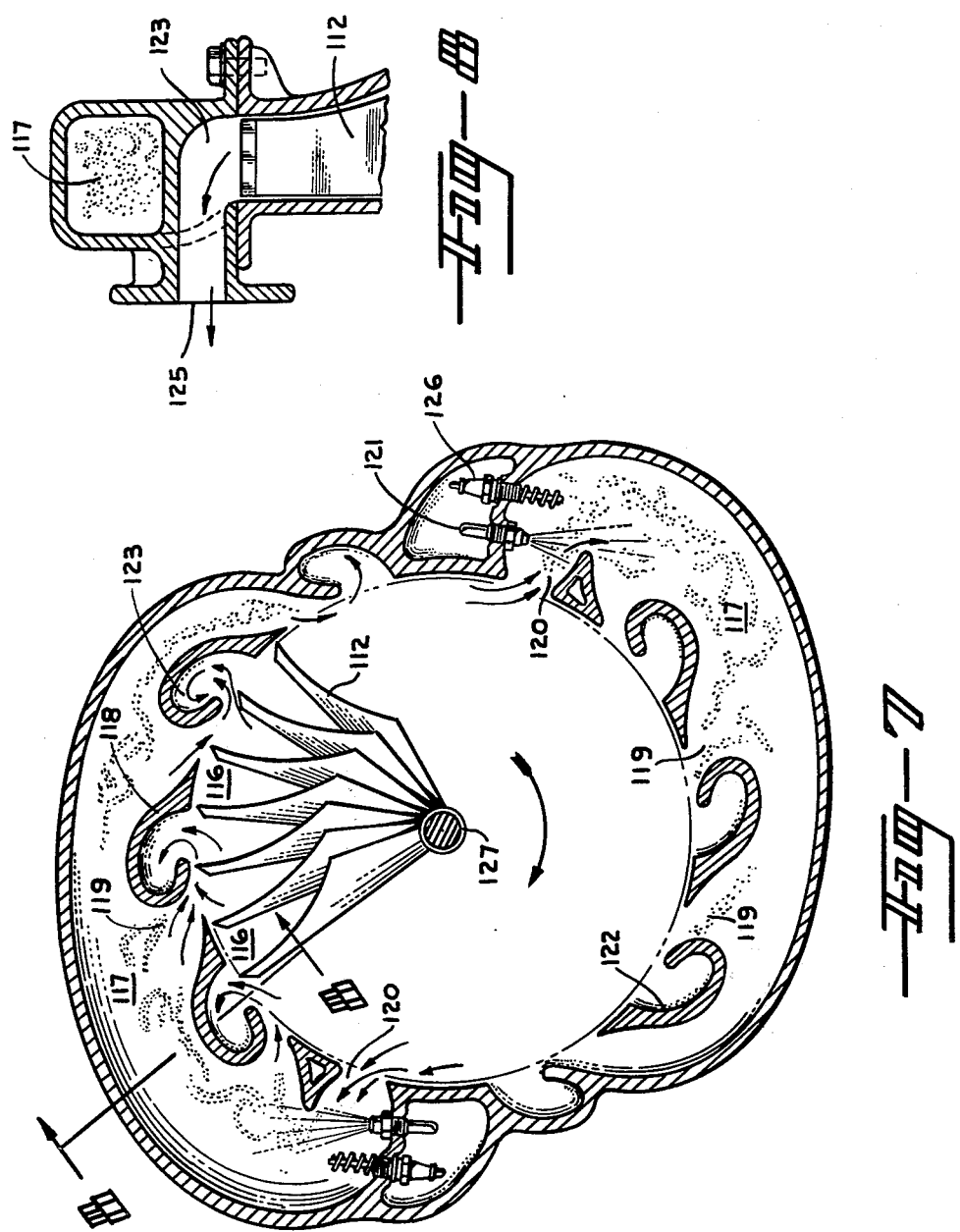

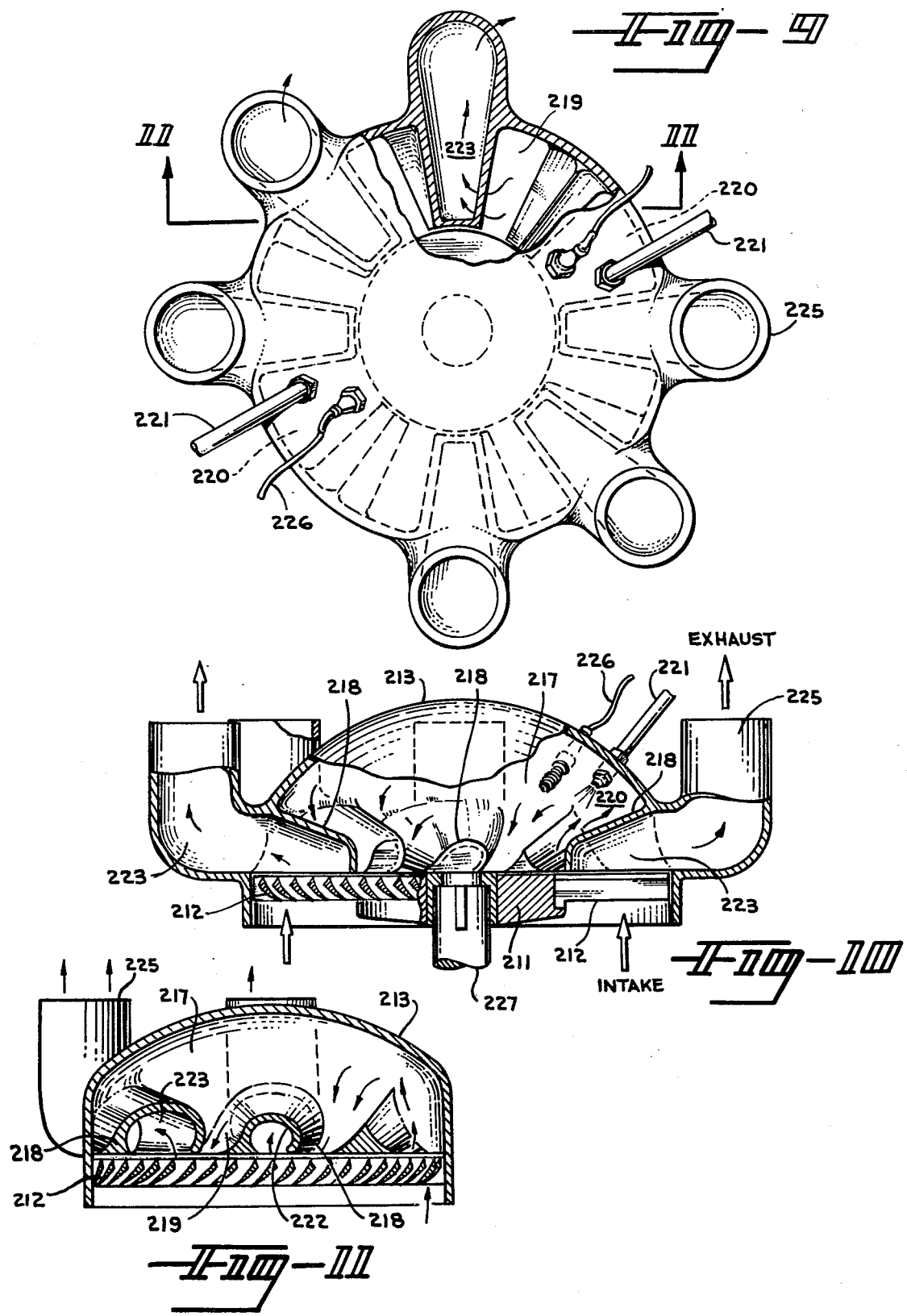

INTEGRATED FLOW TURBINE ENGINE

RELATIONSHIP TO PRIOR APPLICATION

This is a continuation of application Ser. No. 299,135, filed Oct. 19, 1972 (abandoned); a Divisional of Application No. 40,633, filed May 26, 1970 (U.S. Pat. No. 3,709,629); and a C-I-P of application Ser. No. 741,623, filed July 1, 1968 (abandoned).

SUMMARY

This invention relates to an integrated flow gas turbine, and more particularly to a novel engine in which hot gases created by the combustion of fuel in a combustion chamber are caused to impinge upon blading of a dual purpose rotor arranged to rotate at high speed and to deliver air under pressure to the combustion chamber, my engine serving to deliver a useful amount of shaft power, or as a gas generator.

Most gas turbine engines today are equipped with a separate compressor, often driven from the same shaft as the turbine, for it is necessary to have a considerable amount of air flowing into the engine in order for combustion to take place on a continuous basis in the combustion chamber.

The present invention differs substantially from known prior art engines by utilizing a rotor containing only one set of blades, but with these blades being configured and arranged to perform not only the function of compressing the incoming air and delivering it into the combustion area of the engine, but also the function of receiving the reaction or thrust from the high temperature gases, with the reaction of the gases against the blades serving to perpetuate the rotation thereof. Thus, my engine utilizes well known compression, combustion and reaction cycles in a novel and useful arrangement.

All facets of my invention involve the dual purpose rotor arrangement in which one portion of each blade of the rotor receives the thrust from burning hot gases, such serving to cause further and continued rotation of the blading, and with another portion of each blade of the rotor serving to accomplish the compression of incoming air for the combustion to continue in the intended manner, and for cooling of the blades. However, one embodiment of my invention involves a centripetal flow arrangement in which the rotor is disposed radially outwardly with respect to the combustion chamber, with the relatively cool incoming air flowing centripetally along the blades, and then entering the combustion chamber, with the products from the continuous combustion then flowing outwardly through guide nozzles so as to react against the radially inner portions of the blades, thus to cause the continued rotation of the rotor.

Another embodiment of my invention involves a centrifugal flow arrangement in which the rotor is disposed radially inwardly of the combustion chamber, with air compressed by the rotor flowing centrifugally into the combustion chamber, with the products of combustion thereafter flowing past the radially outer portions of the blades. Still another embodiment involves an axial flow arrangement, with the relatively cool air from the final compressor stage entering the combustion chamber axially, and then flowing in the reverse direction through guide nozzles and reacting against the trailing portions of the final compressor stage blading, thus causing the continued rotation of the rotor, with the configuration in each embodiment being such that uncombusted compressed air separates the blades from the combustion products to such an extent that heating of the blades is minimized, thus permitting the use of much less expensive blades than are required in conventional gas turbines, where no such cooling effect is present.

It is therefore a principal object of my invention to provide an integrated flow gas turbine in which a single rotor is utilized.

It is another object of my invention to provide a gas turbine in which air compressed by a rotor is caused to flow along the blading of the rotor in such a manner as to cool the blading, even in the presence of combustion products.

It is still another object of my invention to provide novel blade configurations for a dual purpose rotor, thus to extract a maximum amount of thrust from the combustion products, and at the same time to derive the maximum cooling for the blades.

It is still another object of my invention to provide a gas turbine in which the products of combustion react against an air boundary that automatically adapts its shape to changes in turbine operating parameters.

These and other objects, features and advantages of my invention will be more apparent from a study of the appended drawings in which:

FIG. 1 is a side elevational view of my integrated flow gas turbine in the centripetal flow embodiment, with some parts in section to reveal internal detail;

FIG. 2 is an end view of the device shown in FIG. 1, also being partly in section;

FIG. 3 is a perspective view of my gas turbine to a smaller scale;

FIG. 4 is a view taken along lines 4—4 in FIG. 1 to reveal gearing;

FIG. 5 is a view taken along lines 5—5 in FIG. 1 to reveal further blading and nozzle details of the centripetal flow embodiment;

FIG. 5a is an enlarged view of a portion of FIG. 5, but revealing blading of a different shape;

FIG. 6 is a fragmentary perspective view of one of the members shown in FIG. 5;

FIG. 7 is a cross-sectional view of a centrifugal flow embodiment of my invention;

FIG. 8 is a view taken along lines 8—8 in FIG. 7;

FIG. 9 is a plan view of an axial flow embodiment of my invention;

FIG. 10 is a cross-sectional view of the axial flow embodiment at approximately the mid portion; and FIG. 11 is a view taken along lines 11—11 in FIG. 9.

DETAILED DESCRIPTION

Turning now to FIG. 1, it will be seen that I have there shown a side elevational view of an exemplary version of my integrated centripetal flow gas turbine 10, with portions of this figure presented in section to reveal internal detail. A rotor 11 is arranged to rotate about a stationary combustion chamber 17, as perhaps best seen in FIGS. 2 and 5. FIG. 3 shows to a reduced scale, the external appearance of the engine.

The rotor 11 comprises a plurality of essentially straight blades 12 arranged in a circular combination, with the blades at one end of the device as seen in FIG. 1 joined to a support ring 34 that is rotatable on a bearing 35. On the other end, the blades are joined to an internal gear 28 that is in mesh with a plurality of gears 29 mounted on shafts 32, from which power can be delivered for accessories or the like. Engine torque is transmitted to a drive shaft 27 via small gears 30, which are also mounted on the shafts 32. These small gears mesh with large gear 31, which is mounted upon shaft 27. Note FIG. 4.

It will be noted that the blades 12 are essentially arcuate in cross section, having a concave side 14 and a convex side 15, and being spaced essentially equidistant so as to provide space 16 between the blades. It will further be noted that the blades are of comparatively thick construction, with the tips thinner than the roots. As will be seen in greater detail hereinafter, the blades 12 in these figures are thicker at the root location 12a to provide a reaction surface against which gases can react to cause the rotor to turn at a high rate of speed.

Referring principally to FIGS. 2 and 5, it will be noted that the centrally disposed combustion chamber is defined by a plurality of stationary wall components 18 located adjacent the inner periphery of the blades of the rotor 11. As will be seen in FIG. 1, these wall components are of substantially arcuate configuration, being supported by stationary end plates 13, with a non-rotating shaft 37 extending between these end plates to maintain them in the desired relationship. A shroud 38 surrounds the shaft 37 so as to protect it from the heat of the combustion process. Shaft 37 is hollow to permit cooling air to flow through.

FIGS. 2 and 5 reveal that the arcuate wall components 18 are spaced apart so as to form at most locations, guide nozzles 19 which communicate with the combustion chamber 17. It is through these nozzles that exhaust gases flow in order to react against the base of blades 12. Wall component 24 is different from the generally arcuate wall components 18 in that it contains at least one fuel nozzle 21 and igniter 26; see FIG. 6.

Adjacent the wall component 24 is defined an intake duct 20 through which air compressed by the rotation of the blades 12 is caused to flow centripetally so as to enter the combustion chamber; see FIGS. 2 and 5. Fuel nozzle 21 sprays fuel to mix with this incoming air, with the fuel to air ratio being such that a continuous combustion process can take place in the volume 17 enclosed by the stationary wall components 18. FIG. 1 reveals that more than one fuel nozzle and more than one igniter can be utilized. Each of the wall components 18 is provided with a concave side 22 facing away from the combustion chamber 17, so as to form a recess 23 between the combustion chamber and the rotor, which recess substantially faces the rotor. The several recesses 23 in effect form exhaust ducts, which in turn connect to the exhaust opening 25 revealed in FIG. 1 and 2 to be disposed in one of the end plates 13.

Combustion takes place substantially within the central chamber defined by the arcuate members 18, with the combustion products leaving the nozzles 19 at great speed and impining upon the radially inner ends 12a of the rotor blades 12. During steady state operation, the pressure of the air compressed by the rotation of the blades 12 is only slightly higher than the pressure of the combustion products flowing outwardly through the nozzles 19, but both of these pressures are much higher than the pressure in the recesses 23 and the exhaust ducts. Thus, the hot combustion gases deflect off of the lower surfaces 12a of the blades 12 and are then drawn inwardly with unburned air into the recesses 23 defined in the interior of the stationary wall components 18. Gas in the recesses 23 flows from right to left as viewed in FIG. 1, and then flows outwardly through the exhaust openings 25.

FIG. 5a reveals in general the phenomenon just discussed wherein the hot gases leaving an exhaust nozzle 19 in fact flows around the hooked portion 18a of the member 18 and thence flows into the interior portion 23 of the stationary wall component. It should be noted that unburned gases flowing centripetally between the blades 12 deflect these combustion products and thus prevent the overheating of the blades. A cool air boundary may be regarded as existing between a location adjacent the point 33 of each member 18, and a location slightly radially outwardly of the hooked portion 18a of the stationary wall component. This hot-cold boundary is identified by a short curved dashed line in FIG. 5a. This boundary will tend to remain in the approximate position just described during steady state operation of my turbine, although it is continually interrupted by the radially inner portions of the blades as they continue to rotate. Engine acceleration increases the pressure of the hot gases flowing through the exhaust nozzles 19 and causes the cool air boundary to bend away from the portion 18a of the stationary wall component until such time as acceleration has ceased, at which time the boundary will be restored to essentially the original position.

In FIG. 5a, cool gases are shown having a radially inward vector, but they additionally have a large rotational vector, the resultant of these vectors forming an angle of less than 45° with path of the radially inward edges of th blades. As shown in FIG. 5a, the hot gases flow radially outwardly at an angle of less than 45° to the same blade path. Thus, hot and cold gases intersect at an angle of less than 90°, and through careful design, turbulence at the hot-cold boundary will be minimal.

as will be discussed hereinafter, FIG. 5a depicts a slightly different blade configuration from that involved in FIGS. 2 and 5, foor in FIG. 5a, the blades have a rounded base portion 12b.

I have noted that the unburned compressed air flowing through spaces 16 will increase in pressure as it proceeds radially inward towards base 12a or 12b of each blade, at which location it will expand slightly due to the additional space available. In FIG. 5, after a given blade has moved past a given nozzle 19 to a position essentially adjacent the hook portion 18a, the base 12a of the blade is then reacted upon by the hot combustion gas. The slight expansion of the compressed gas, the change of direction of the combustion gases and the difference in velocities of the burned and unburned gases causes a certain amount of turbulence within the boundary previously described to exist from the point 33 along the space between the hooked portion 18a and the radially inner portion 12a of the nearest blade 12. However, the substantial temperature difference between the burned and the unburned gases tends to minimize the mixing of the gases.

It is important to note with regard to FIG. 5 that the only section of the blades reacted upon by the hot combustion gases is the base portion 12a, and significantly, even this portion is intermittently cooled by the air compressed by the blades that travels past the nozzles.

Returning to FIG. 5a, it will be noted that the lower surface 12b of the blades has been shaped, with the entire trailing surface of the blade now being convex, with a smaller radius at the root of the blade than at the opposite edge of the blade. In the configuration in accordance with FIG. 5a, the cool air boundary tends to be defined by the blade roots as the blades pass by the nozzle, and most importantly, the hot gas only approaches the radially inner tip of the blade, with the turbine reaction taking place against the cool air boundary. This arrangement makes it possible for the first time to design a simple air boundary blade of variable shape that will efficiently adapt itself to radical changes in operating parameters, such as absolute pressure, absolute temperature, velocity, accelerations and different fuels. This is of course in contrast with conventional turbines, which must be designed for fixed shape solid blades.

Turning now to FIG. 7, it will be seen that many of the relationships involved in this integrated centrifugal flow gas turbine are quite similar to those described in conjunction with the centripetal flow design discussed in conjunction with FIGS. 1 through 6. In FIG. 7, the rotation of the blades 112 causes a substantial amount of flow of unburned air to enter the air intake ducts 120, flowing in each instance past a nozzle 121 and an igniter 126. Fuel is sprayed into the chambers 117 in the proper ratio in order that an effective combustion process can take place in the combustion chambers. Combustion products then flow at substantial speed radially inwardly through the exhaust nozzles 119 so as to impinge upon the tips of the blades 112.

As will be noted from the upper portion of FIG. 7, there is a substantial amount of mixing taking place between the burned and unburned gases, with the unburned gases serving to protect the tips of the blades 112. Inasmuch as pressure in the recesses 123 defined in the stationary wall components 118 opposite the combustion chamber 117 is less than the pressure of either the burned or the unburned gases, the mixture flows into these recesses and thence in a substantially axial direction to an overboard location.

FIG. 8 reveals a section taken along lines 8—8 in FIG. 7 to reveal the manner in which the exhaust gases leave the engine.

Turning now to FIG. 10, and to related FIG. 9, it will be noted that I have there shown an integrated axial flow gas turbine in accordance with my invention, in which the combustion chamber 217 is defined by stationary end plate 213 and radially oriented stationary wall components 218 adjacent which axial flow rotor 211 is disposed. The blades 212 of this rotor are mounted upon a shaft 227 at spaced locations, with the rotation of this shaft causing air to be delivered into intake ducts 220, which connect into the combustion chamber 217. Several fuel nozzles 221 inject fuel into the combustion chamber 217 so as to achieve the proper fuel to air ratio necessary for desirable combustion. Hot combustion gases leave the combustion chamber through exhaust nozzles 219 so as to react upon the adjacent tips of the blades 212 in the manner shown in FIG. 11. As before, there is a cool air boundary to deflect the combustion products, with the result being that the blades 212 are protected from being overheated. Thereafter, the burned and unburned gases flow outwardly through ducts 223 that connect to exhaust openings 225.

As should now be apparent, there is sufficient reaction of the combustion products against the near side of the blades 212 to cause the rotor 211 to rotate and provide useful power.

As will now be apparent, I have described several embodiments of my invention that I regard as being primary, with different ones of these embodiments being suitable to meet a wide variety of needs.

However, I am not to be limited to the embodiments shown and described herein, for if desired, the compressed air or the hot combustion products could be generated elsewhere and then directed into a machine in accordance with any of the primary embodiments of this invention, or compressed air from a separate source could be used for blade cooling instead of being generated by the blades of this invention.

As a further point, a portion of the blading can be utilized only for compression, involving a structural modification different than the foregoing, and involving use of a flow divider such that part of the air compressed by the rotor is delivered for combustion into an adjacent surrounding combustion chamber, whereas the remainder of the flow from the compressor is utilized only for cooling this other portion of the blading.

As a further point, one edge of a blade can be used for generating pressure and an essentially perpendicular edge can be used for obtaining thrust and yet be self-cooling. For instance, the outward tips of a centrifugal compressor can be used for conventional generation of pressure, while portions of the radial edges can be beveled, shaped, or otherwise configured and used as a turbine reaction surface.

As a further point, almost any conventional or other turbine blade can be utilized for obtaining thrust and yet be self-cooling by utilizing the previously described cool air boundary for hot gas reaction.

I claim:

1. An integrated flow turbine engine comprising a rotor which has a single set of identical blades attached to it, said rotor with said blades serving both as a compressor and a turbine, at least one combustion chamber in which fuel is combusted, said rotor, upon being caused to rotate, serving to deliver air to said combustion chamber to mix with fuel therein, a plurality of substantially arcuately shaped wall components defining a boundary between said rotor and said combustion chamber, said wall components being spaced somewhat apart to accomodate the flow of gases between said combustion chamber and said rotor, at least one exhaust nozzle extending from said combustion chamber and directed toward a portion of said rotor, said exhaust nozzle being configured to direct the hot gases flowing from said combustion chamber onto an essentially different portion of the blades of the rotor than the portions concerned with the compression of incoming air, thus to drive said rotor in rotation, said rotor being in essentially surrounding relationship about said combustion chamber, and the air compressed by said rotor flowing essentially centripetally in flowing into said combustion chamber.

2. The integrated flow turbine engine as defined in claim 1 in which said arcuate wall components are configured to define recesses for conveying gases already utilized to impart thrust to said rotor to an exit location, said gases at that time flowing in a direction essentially parallel to the axis of rotation of said rotor.

3. An integrated flow turbine engine comprising a housing, a rotor mounted for high speed rotation in said housing, said rotor having a single set of identical blades affixed to it, said rotor with said blades serving both as a compressor and as a turbine, at least one combustion chamber disposed in said housing at a location in close proximity to said rotor, a plurality of substantially arcuately shaped wall components defining a boundary between said rotor and said combustion chamber, said wall components being spaced somewhat apart to accommodate the flow of gases between said combustion chamber and said rotor, said combustion chamber having means therein for the injection of fuel such that a controlled amount of combustion can be brought about in said combustion chamber, said blades of said rotor being one piece, elongate members, having substantially cuneiform edge portions, said combustion chamber having at least one inlet means through which air compressed as a result of the rotation of said blades can be caused to enter, said inlet means being adjacent said cuneiform edge portions of said blades, said combustion chamber also having a plurality of exit nozzles, said exit nozzles being on the same side of said rotor as said inlet means, at circularly different locations, and having flow axes at an acute angle to the path of said cuneiform edge portions of said blades, through which exit nozzles, combustion products generated in said combustion can react against said cuneiform edge portions and thus bring about the driving of said rotor at high speeds.

4. The integrated flow turbine engine as defined in claim 1 in which said combustion chamber is essentially in a radially outward relationship to said rotor, and the air compressed by said rotor flows essentially centrifugally in flowing into said combustion chamber.

5. The integrated flow turbine engine as defined in claim 4 including arcuate inner portions of said wall components configured to define recesses for conveying exhaust gases in a direction essentially parallel to the axis of rotation of said rotor.

6. The integrated flow turbine engine as defined in claim 1 in which the plurality of substantially arcuate components are defined in a substantially radial array with arcuate inner portions away from said combustion chamber being configured to define recesses for conveying exhaust gases in a radially outward direction.

7. The integrated flow turbine engine as defined in claim 1 in which the combustion products generated in said combustion chamber are directed by said exit nozzle radially inwardly in order to act only against said edge portions of said blades, with the combustion products leaving said blades then flowing radially outwardly, and exhaust collection means leading outside said housing, through which said combustion products flow, said exhaust collection means being on the same side of said rotor as said inlet means, but disposed at a circularly different location.

8. The integrated flow turbine engine as defined in claim 1 in which an axial flow device is defined, in which the combustion products are directed by said exit nozzle substantially axially in order to act upon the blades of said rotor, and then substantially reversing direction so as to flow axially away from said rotor, and exhaust collection means into which the hot gases then flow.

9. The integrated flow turbine engine as defined in claim 1 in which the blades of said rotor have at least two sides, with one side of each blade of the rotor being essentially perpendicular to said inlet means, and the reverse side of each blade including said edge portion, being essentially perpendicular to said exit nozzle.

10. The integrated flow turbine engine as defined in claim 3 in which said cuneiform edge portion of each of said blades is essentially perpendicular to said flow axes of said exit nozzles.

11. An integrated flow turbine engine comprising a housing, a rotor mounted for high speed rotation in said housing, said rotor having a single set of identical blades affixed to it, said rotor with said blades serving both as a compressor and as a turbine, at least one combustion chamber disposed in said housing at a location in close proximity to said rotor, a plurality of substantially arcuately shaped wall components defining a boundary between said rotor and said combustion chamber said wall components being spaced somewhat apart to accommodate the flow of gases between said combustion chamber and said rotor said combustion chamber having means therein for the injection of fuel such that a controlled amount of combustion can be brought about in said combustion chamber, the blades of said rotor being one piece, elongate members, said combustion chamber having at least one inlet means through which air compressed as a result of the rotation of said blades can be caused to enter, said combustion chamber also having at least one exit nozzle, said exit nozzle being on the same side of said rotor as said inlet means, but at a circularly different location, through which exit nozzle, combustion products generated in said combustion chamber can exit, said blades each having an edge portion arranged to pass near said exit nozzle during rotation of said rotor, so that combustion products emanating from said combustion chamber can react against said edge portions and thus bring about the driving of said rotor at high speeds, a centripetal flow arrangement thus being defined, with the combustion products from said exit nozzle of said combustion chamber flowing radially outwardly so as to impinge upon said edge portions of said blades, with the combustion products thereafter turning and then flowing substantially radially inwardly, and exhaust collection means disposed radially inwardly of said rotor, into which the combustion products then flow.

* * * * *